Dec. 1, 1942.    A. RUHRMANN    2,304,056
MEANS TO MEASURE ALTERNATING POTENTIALS
Filed May 16, 1941
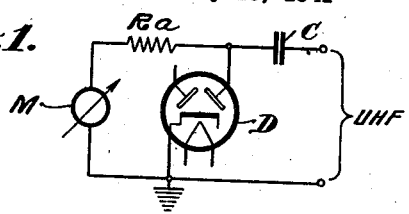
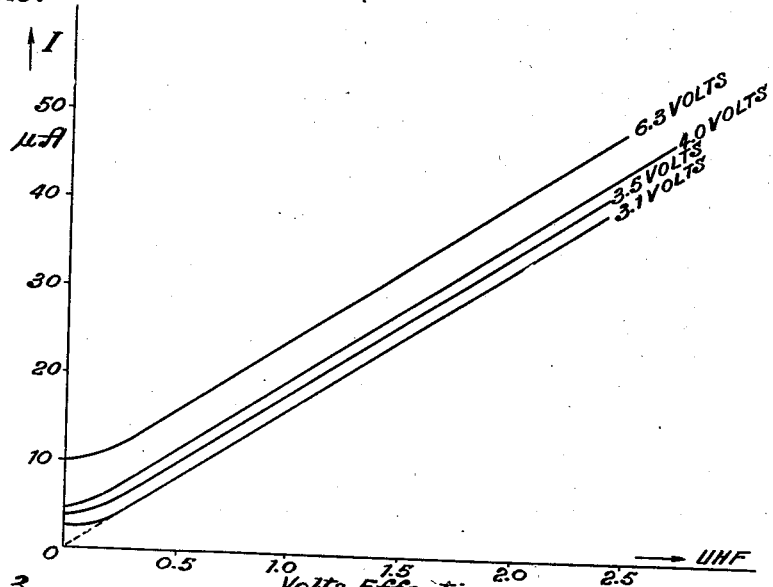
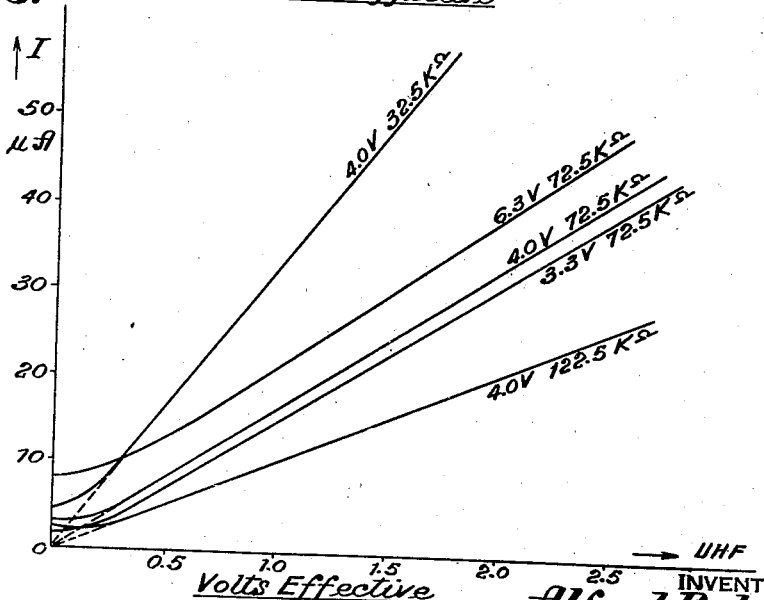
INVENTOR
Alfred Ruhrmann
BY
H. S. Grover
ATTORNEY Patented Dec. 1, 1942

2,304,056

UNITED STATES PATENT OFFICE 2,304,056

MEANS TO MEASURE ALTERNATING POTENTIALS

Alfred Ruhrmann, Berlin, Germany; vested in the Alien Property Custodian

Application May 16, 1941, Serial No. 393,796
In Germany November 30, 1939

2 Claims. (Cl. 171—95)

To measure current in the oscillation circuits of power transmitters, the general practice nowadays is to use moving-coil type instruments (milli-voltmeters) with thermo-converters connected through current transformers. For a number of reasons of a radio frequency and measuring nature, it is customary to step up the current to 2 amperes and to make the measuring range of the thermo-converter accordingly.

Particularly in the construction of tuning indicator devices used in combination with transmitters, it is necessary to convert the radio frequency current in a linear way and at the same time in proportion to the direct current. For this purpose the current transformer has a small resistance load, and the voltage drop across this small resistance is rectified. The potentials thus to be rectified are of an order of magnitude of 2 volts since a current transformer for reasons of phase error and overloading of the iron is unable to carry a load of any value at all.

Inside the range of such low potentials, the lack of linearity caused by the starting current of the rectifier tube or diode makes itself disagreeably felt. For it will be understood that this starting current imposes a limitation upon the field or range of application of the peak rectifier circuit arrangement customarily used for higher voltages in a downward sense, that is to say, to about 10 volts.

The present invention discloses ways and means which make it possible to insure linear and at the same time proportional rectification down to very low potentials without the necessity of providing compensating potentials, and the same similarly is suited for the measurement of alternating potentials; and, in an indirect way, for the measurement of alternating current ( that is, after change into a potential by the aid of a resistance or of a current transformer).

According to the invention, the cathode of a diode connected in a peak rectifier circuit scheme is underheated to such an extent that, inside the range in which there is a linear interrelationship between the direct current potential and the alternating potential, there exists at the same time proportionality between the direct current and the alternating current potential.

Referring to Fig. 1, the alternating potential to be measured is designated by the ultra high frequency source UHF. The diode D is connected by way of condenser C and has a high-ohm external resistance $Ra$. The ensuing direct current is measured with the measuring instrument M. Instead of this circuit arrangement, there could also be used a diode circuit organization known in the art in which the diode is connected in series with the resistance by-passed by a condenser.

Referring to Fig. 2, the upper curve shows the shape of the direct current in the load circuit with $Ra=70$ kilo-ohms approximately as a function of the applied radio frequency potentials in the presence of normal cathode heating of 6.3 volts. It will be noted that the direct current by no means is proportional to the alternating potential, although the upper part of the curve is largely linear. At four volts cathode heating, the curve is slightly shifted downward and roughly parallel, although it is not yet proportional. But at 3.1 volts cathode heating, the graph has the desired proportionality since an extension of the characteristic passes through zero. At the same time the measurement of smaller potentials is made possible.

Fig. 3 shows the same investigations on another diode of the same type which, judging by appearances, was more feebly heated, at the same potential, than the tube first examined. At $Ra=72.5$ kilo-ohms (the resistance of the measuring instrument of 2.5 kilo-ohms being included) graphs were plotted at 6.3 volts, 4 volts, and 3.3 volts cathode heating. The curve for 4.0 volts heating again showed the desired proportionality.

The accuracy of the assumption that the desired effect may always be reproduced at the same cathode temperature which is decisive for the starting current, was proved by plotting the dependence of the starting current upon the heating potential. It was ascertained that in the presence of the heating potentials required for proportionality there flows always the same starting current (for instance $\mu A$ through 12.5 kilo-ohms external resistance). In the case of another diode and three others of a new shipment, it was thus possible on the basis of the starting current to determine the requisite heating potential and to reproduce proportionality in a perfect manner. What is remarkable in this connection is the fact that not only the proportionality proved reproducible, but the whole calibration curve, for all points.

In Fig. 3, in addition to the calibration curves for 72.5 kilo-ohms, similar curves plotted for 30 and 120 kilo-ohms external resistance are shown which also insure proportionality. Variation of the external resistance $Ra$ serves to vary the measuring range.

As pointed out, the calibration curves found for various diodes, for proper regulation of the heating on the basis of the starting current, for identical external resistances, are found to agree exactly, and this gives a by no means inconsiderable advantage that the scale of reading instrument M before being mounted may be calibrated with direct current, recalculation for alternating current being linear, the initial range being suitably suppressed or calibrated accordingly.

The fact that such marked underheating is used has no unfavorable effect upon the life of the diodes inasmuch as the load is extremely low.

The dependence of the readings upon fluctuations of the heating potential is not any more marked than with normal or rated heating. Fluctuations in heating potential resulted in fluctuations of readings equal about to one-half the relative size of the heating potential fluctuation, brief shocks being equalized and balanced by the pronounced thermal inertia of the indirectly heated cathode.

The invention is also applicable to detectors in receiver circuits.

What is claimed is:

1. A peak voltage rectifier system comprising a diode having an anode electrode and an indirectly heated cathode electrode, terminals across which the alternating current potential to be measured is applied, said terminals being connected to said electrodes, a condenser in the connection between one of said terminals and that electrode to which said one terminal is connected, a resistor and a meter in circuit with said condenser, the value of said resistor being large compared to the internal resistance of the diode, the value of the condenser being low compared to the internal resistance of the diode, and means for heating said cathode at a temperature which is the lowest that will provide space charge limitation of current flow.

2. A peak voltage rectifier system comprising a diode having an anode electrode and an indirectly heated cathode electrode, a source of radio frequency potential to be measured connected to said cathode and through a condenser to said anode, a resistor in series with a meter connected across said anode and cathode, and means for heating the cathode and for adjusting the cathode temperature to a value sufficiently high to provide electron emission in excess of what is required for space charge limitation of the peak diode current for any voltage to be rectified but which value is sufficiently low so that the thermal energy of the emitting electrons is small compared to the lowest voltage to be rectified, whereby there is obtained a substantially linear relation between the alternating current input and the rectified direct current.

ALFRED RUHRMANN.